US007349796B2

(12) United States Patent
Toyama et al.

(10) Patent No.: US 7,349,796 B2
(45) Date of Patent: Mar. 25, 2008

(54) APPARATUS AND METHOD FOR JUDGING A PISTON POSITION IN AN ENGINE

(75) Inventors: Yuichi Toyama, Isesaki (JP); Hirokazu Shimizu, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/472,346

(22) Filed: Jun. 22, 2006

(65) Prior Publication Data

US 2006/0293830 A1 Dec. 28, 2006

(30) Foreign Application Priority Data

Jun. 23, 2005 (JP) ............................ 2005-183773

(51) Int. Cl.
*G01M 15/05* (2006.01)

(52) U.S. Cl. ........................................ 701/114; 73/116

(58) Field of Classification Search ................ 701/114, 701/113, 106; 73/116, 117.3, 35.03, 35; 123/435, 491, 406.61, 406.62, 406.63, 406.58
See application file for complete search history.

(56) References Cited

U.S. PATENT DOCUMENTS 6,272,426 B1 * 8/2001 Tascillo ...................... 701/106
6,568,372 B1 * 5/2003 Kanno ........................ 123/491
6,784,658 B2 * 8/2004 Kawagoe et al. ........... 324/163
6,901,790 B2 * 6/2005 Arai et al. ................. 73/118.2
6,904,879 B2 * 6/2005 Kato ..................... 123/73 AD
6,907,342 B1 * 6/2005 Matsuoka ................... 701/113
7,017,556 B2 * 3/2006 Borg et al. ................. 123/491
7,182,062 B2 * 2/2007 Beer et al. .................. 123/305
7,188,020 B2 * 3/2007 Yasui et al. ................. 701/103
7,191,747 B2 * 3/2007 Kramer ................... 123/182.1

FOREIGN PATENT DOCUMENTS

JP 2004-044470 A 2/2004

* cited by examiner

*Primary Examiner*—Willis R. Wolfe, Jr.
*Assistant Examiner*—Johnny H. Hoang
(74) *Attorney, Agent, or Firm*—Foley & Lardner LLP

(57) ABSTRACT

Detection of which of a plurality of reference angle positions a crankshaft of an engine arrives at is executed to subsequently determine a crank angle region in which an output pattern of a cam angle signal is determined, based on which of the plurality of reference angle positions the crankshaft arrives at, whereby determination of a piston position in each cylinder is made, based on the output pattern of the cam angle signal in the crank angle region.

29 Claims, 4 Drawing Sheets

APPARATUS AND METHOD FOR JUDGING A PISTON POSITION IN AN ENGINE

BACKGROUND OF THE INVENTION

1. Field of the Invention

The present invention relates to a technology for determining a piston position in each of the cylinders of an engine.

2. Description of the Related Art

Japanese Unexamined Patent Publication No. 2004-044470 discloses an apparatus for detecting a piston position in each of the cylinders of an engine based on a combination of a reference crank angle position and a cam angle signal.

In the respective cylinders of a three-cylinder engine having respective pistons, the compression top dead centers appear in turn at an interval of crank angle of 240 degrees during the rotation of the crank shaft, and the compression top dead centers of three respective cylinders occur at every position of the crank angle spaced apart by 120 degrees.

Accordingly, in the case where the piston position determination is performed in the three-cylinder engine, it is necessary to determine whether or not it is the determination timing for each stroke phase difference, at each time when the crank angle position reaches the reference crank angle position at each crank angle of 120 degrees, and further, when determination is made that it is the determination timing for each stroke phase difference, it is necessary to determine which one of the cylinders is on a predetermined piston position.

Further, in an engine provided with a variable valve timing mechanism which varies the phase of a camshaft relative to a crankshaft, valve timing may be detected based on a phase difference between a cam angle signal output from a detection device disposed on the camshaft and a crank angle signal output from a detection device disposed on the crankshaft.

Therefore, in a conventional technology, in the case where determination of the piston position in each cylinder of the three-cylinder engine is executed accompanying execution of detecting of the valve timing, such a function might be requested to exhibit that the cam angle signal is generated at a minute interval.

However, in the case where the cam angle signal is generated by, for example, using a sensor in which an electromagnetic pickup detects protruding portions disposed on a signal plate, since the resolution of the above-mentioned sensor is low, it is difficult to realize the above-described function and also to ensure the stable detection precision.

SUMMARY OF THE INVENTION

It is, therefore, an object of the present invention to enable the determination of a piston position and the detection of valve timing at a high accuracy by the utilization of a simple cam signal generating pattern.

In order to achieve the above object, according to the present invention, a crank angle region in which counting of the number of generation of cam angle signals is to be executed, is determined based on the fact that which of a plurality of reference angle positions a crankshaft now arrives at, and determination of a piston position in each cylinder is executed, based on an output pattern of the cam angle signal in the crank angle region.

The other objects, features and advantages of the invention will become understood from the following description with reference to the accompanying drawings.

PREFERRED EMBODIMENT

Figure 1:
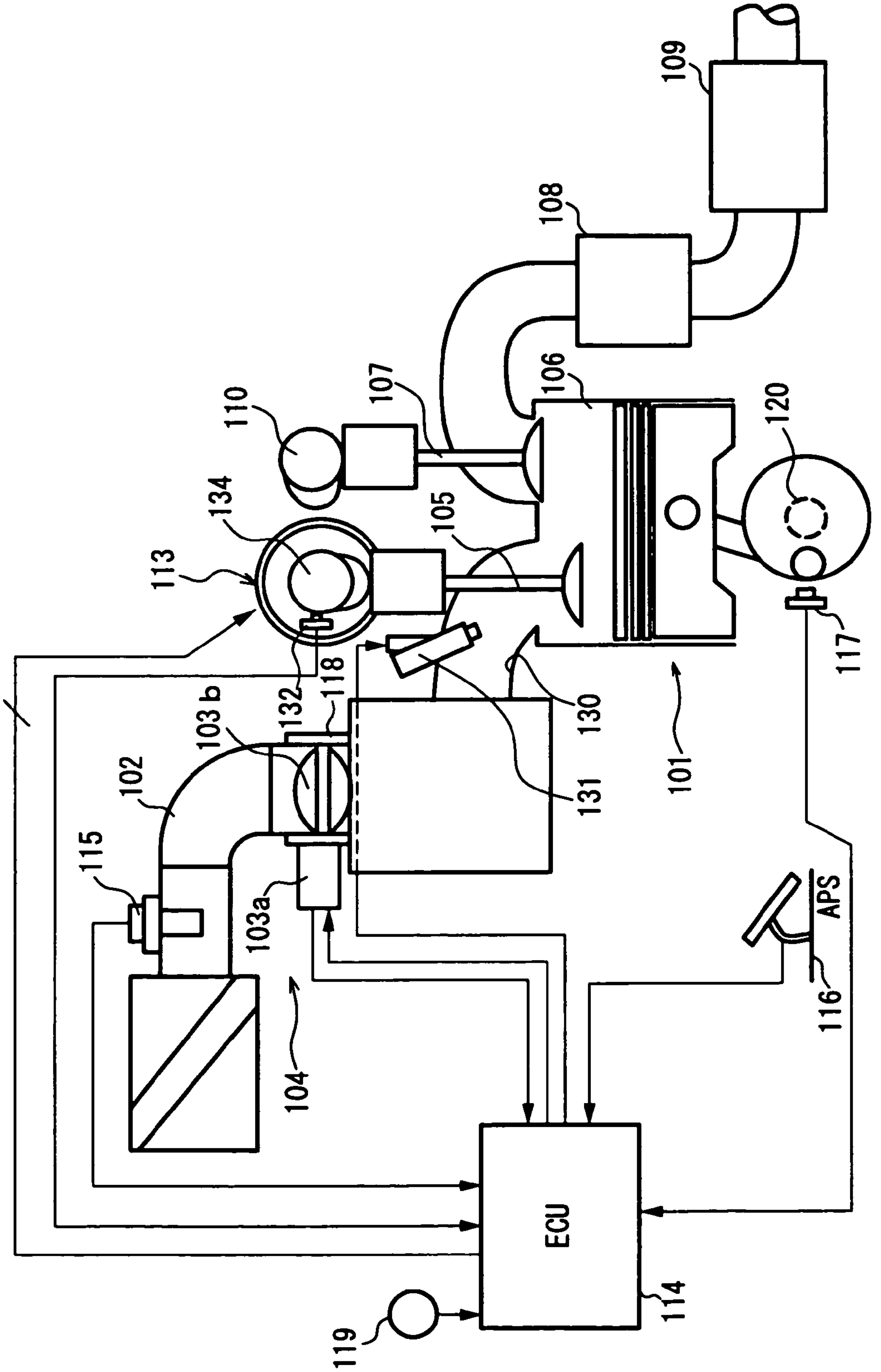
FIG. 1 is a diagram showing an engine in an embodiment of the present invention.

FIG. 1 is a block diagram of a three-cylinder gasoline engine in an embodiment.

In FIG. 1, in intake pipe 102 of engine 101, electronically controlled throttle 104 for driving to open or close throttle valve 103*b* by throttle motor 103*a* is disposed.

Then, air is sucked into combustion chamber 106 via electronically controlled throttle 104 and intake valve 105.

Fuel injection valve 131 is disposed to intake port 130 of each cylinder.

Fuel injection valve 131 injects fuel under pressure adjusted at a predetermined pressure value toward intake valve 105, when it is driven to open based on an injection pulse signal from ECU (engine control unit) 114.

The fuel in combustion chamber 106 is ignited to be combusted by a spark ignition by an ignition plug (not shown in the figure).

The exhaust gas in combustion chamber 106 is discharged into an exhaust pipe via exhaust valve 107, and is purified by front catalyst 108 and rear catalyst 109, and thereafter, is emitted into the atmosphere.

Intake valve 105 and exhaust valve 107 are driven to open or close, respectively, by cams disposed to intake camshaft 134 and exhaust camshaft 110.

Variable valve timing mechanism 113 is disposed to intake camshaft 134.

Variable valve timing mechanism 113 is a mechanism which changes a rotation phase of intake camshaft 134 relative to crankshaft 120, to vary valve timing of intake valve 105.

Incidentally, exhaust camshaft 110 and intake camshaft 134 each performs a half rotation per one rotation of crankshaft 120.

Figure 2:
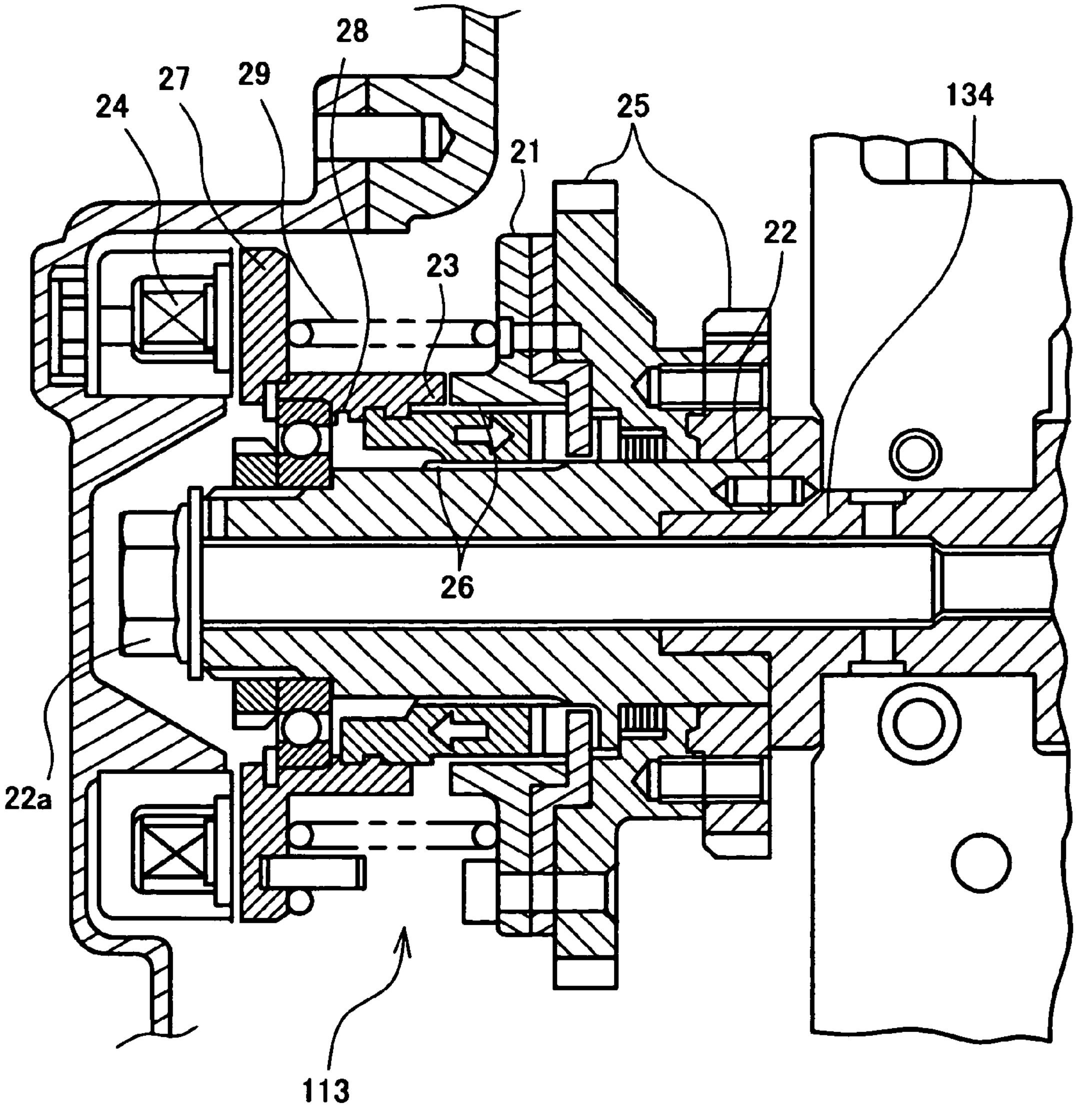
FIG. 2 is a cross-sectional view showing a variable valve timing mechanism in the embodiment of the present invention.

FIG. 2 shows a structure of variable valve timing mechanism 113.

Variable valve timing mechanism 113 includes: first rotator 21 which is fixed to sprocket 25 rotated in synchronism with crankshaft 120, to be rotated integrally with sprocket 25; second rotator 22 which is fixed to one end of intake camshaft 134 by means of bolt 22*a*, to be rotated integrally with intake camshaft 134; and cylindrical intermediate gear 23 which is engaged with an inner peripheral face of first rotator 21 and an outer peripheral face of second rotator 22 by means of helical spline 26.

Drum 27 is connected to intermediate gear 23 via triple thread screw 28, and torsion spring 29 is disposed between drum 27 and intermediate gear 23.

Intermediate gear 23 is urged toward a retarded angle direction (left direction in FIG. 2) by torsion spring 29, and when a voltage is applied to electromagnetic retarder 24 to thereby generate a magnetic force, intermediate gear 23 is moved to an advance angle direction (right direction in FIG. 2), via drum 27 and triple thread screw 28.

A relative phase between rotators 21 and 22 is changed according to an axial position of intermediate screw 23, so that the phase of intake camshaft 134 relative to crankshaft 120 is changed.

Electric actuator 17 and electromagnetic retarder 24 are respectively driven to be controlled based on control signals from ECU 114, according to engine operating conditions.

Incidentally, variable valve timing mechanism 113 is not limited to the structure shown in FIG. 2, and it is possible to apply all of the known variable valve timing mechanisms to the present invention.

ECU 114 incorporating therein a microcomputer, performs the computation processing based on detection signals from various sensors, to control electronically controlled throttle 104, variable valve timing mechanism 113, fuel injection valve 131 and the like.

As the various sensors, there are disposed: accelerator opening sensor 116 for detecting an accelerator opening; air flow meter 115 for detecting an intake air amount of engine 101; crank angle sensor 117 for detecting an angle position of crankshaft 120; throttle sensor 118 for detecting an opening of throttle valve 103*b*; water temperature sensor 119 for detecting the cooling water temperature of engine 101; and cam sensor 132 for outputting a cam angle signal at a predetermined angle position of intake camshaft 134.

Figure 3:
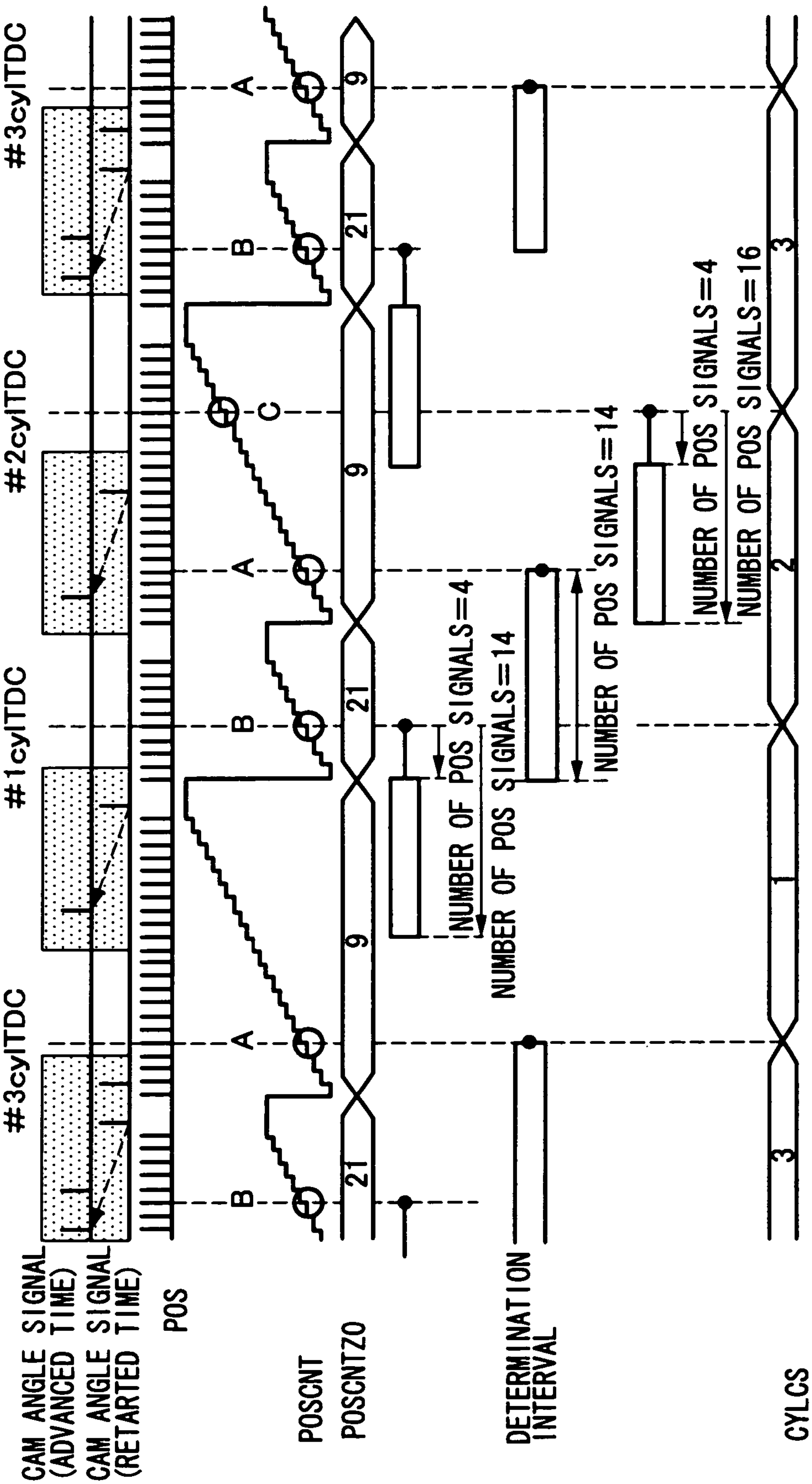
FIG. 3 is a time chart showing output characteristics of various signals, an interval for counting up a cam angle signal, and the like, in the embodiment of the present invention.

Crank angle sensor 117 detects portions to be detected which are disposed on a signal plate attached to crankshaft 120, to output a unit crank angle signal POS at each crank angle of 10 degrees which rises at a top dead center position of each cylinder, as shown in FIG. 3.

Here, the portions to be detected are not disposed partially on the signal plate, so that the unit crank angle signal POS is not output at each of positions of 60 and 70 degrees before the top dead center of #1 cylinder, and further, at each of positions of 60 and 70 degrees after the top dead center of #1 cylinder.

According to crank angle sensor 117, a continuous output interval of unit crank angle signals POS is divided into an interval in which the unit crank angle signals POS of 10 in number are continuously output and an interval in which the unit crank angle signals POS of 22 in number are continuously output.

Accordingly, it is possible to determine whether one of the 2 continuous output intervals or the other continuous output interval, and further, to count up the continuous output frequency of the unit crank angle signal, to thereby detect the angle position of crankshaft 120.

Further, cam sensor 132 detects the portions to be detected on the signal plate attached to intake camshaft 134, to output a cam angle signal at each 120 degrees of camshaft, as shown in FIG. 3.

Incidentally, 120 degrees of camshaft corresponds to 240 degrees of crankshaft, and 240 degrees of crankshaft is an angle corresponding to a stroke phase difference in the three-cylinder engine.

The cam angle signal is output, at each 120 degrees of camshaft, in order of one signal→one signal→two continuous signals.

Note, FIG. 3 shows an output position of the cam angle signal at the most retarded angle time of the valve timing and an output position of the cam angle signal at the most advance angle time of the valve timing.

For example, at the most retarded angle time of the valve timing, the cam angle signal is output at crank angle of 60 degrees before the compression top dead center of each cylinder, and in #3 cylinder, the cam angle signal is output at crank angle of 60 degrees before the compression top dead center thereof, and thereafter, the cam angle signals are continuously output.

Further, in this embodiment, in the case where the valve timing is most advanced, it is advanced by the crank angle of approximately 80.degrees, and the output timing of the cam angle signal is also advanced by approximately 80.degrees.

In the three-cylinder engine of this embodiment, the ignition is performed in order of #1 cylinder→#2 cylinder→#3 cylinder, and an ignition interval is the crank angle of 240 degrees.

Then, ECU 114 determines the cylinder which next reaches the compression top dead center, at each crank angle of 240 degrees, to determine the cylinder which is to be ignited to inject the fuel, based on the judgment result.

Figure 4:
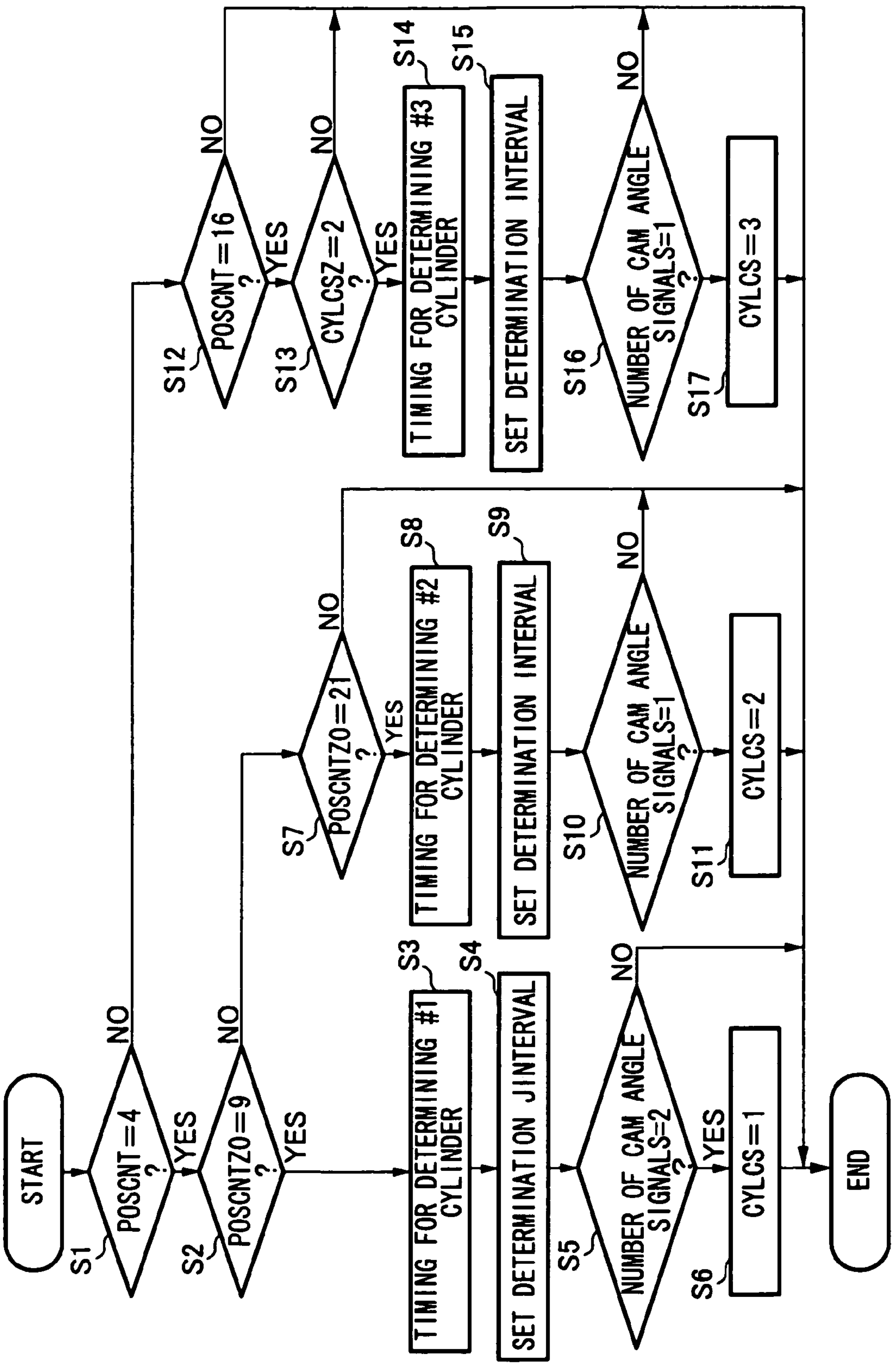
FIG. 4 is a flowchart showing the piston position judgment processing in the embodiment of the present invention.

FIG. 4 is a flowchart showing the piston position determination processing for each cylinder, performed by ECU 114.

In step S1, it is determined whether or not a value of a counter POSCNT is 4.

As shown in FIG. 3, counter POSCNT is counted up each time when the unit crank angle signal POS is outputted, while being reset to 0 when the first unit crank angle signal POS is outputted after the output of the unit crank angle signal POS has been ceased.

Incidentally, whether or not it is the portion where the unit crank angle signal POS is not outputted, is determined by measuring a cycle of the unit crank angle signal POS to compare a previous value of the cycle with a current value thereof.

If it is determined in step S1 that POSCNT=4, the routine proceeds to step S2.

In step S2, it is determined whether or not the value of counter POSCNT for when counter POSCNT has been reset in recent past is 9.

Note, the value of counter POSCNT is set at a previous value POSCNTZ0 when counter POSCNT is reset. Therefore, in step S2, it is determined whether or not the previous value POSCNTZ0 is 9.

When POSCNTZ0=9, it is determined that the current unit crank angle signal POS is the fifth unit crank angle signal POS in the interval in which the unit crank angle signals POS of 22 in number are continuously output.

Here, the time when POSCNT=4 and also POSCNTZ0=9 is made a reference crank angle position A, and when the angle position of crankshaft 120 is on the reference crank angle position A, the routine proceeds to step S3.

The reference crank angle position A is at 10 degrees before the compression top dead center of #3 cylinder and also at 130 degrees before the compression top dead center of #1 cylinder.

However, in this embodiment, since the determination is made on the cylinder which next reaches the compression top dead center, at each 10.degrees before the compression top dead center of each cylinder, the timing of 130 degrees before the compression top dead center of #1 cylinder is not the timing for determining the cylinder which next reaches the compression top dead center.

Therefore, in next step S3, provided that a current reference crank angle position A is at 10 degrees before the compression top dead center of #3 cylinder, it is determined that the timing has come for determining whether or not the cylinder which next reaches the compression top dead center is #1 cylinder.

Then, in next step S4, an angular region which goes back from the reference crank angle position A by 160.degrees is set as a judgment interval of the cam angle signal.

Incidentally, the angular region which goes back from the reference crank angle position A by the unit crank angle signals POS of the counted number of 14 is the determination interval. This is because there is contained only one portion where the unit crank angle signal POS is not outputted, in the angular region which goes back from the reference crank angle position A by 160 degrees.

In next step S5, it is determined whether or not the number of the cam angle signals output in the judgment interval which goes back from the reference crank angle position A by 160 degrees is two.

The judgment as to whether or not the number of the cam angle signals is 2 can be performed based on POSCNT and POSCNTZ0.

As shown in FIG. 3, in the case where the reference crank angle position A corresponds to 10 degrees before the compression top dead center of #3 cylinder, in the judgment interval which goes back from the reference crank angle position A by 160 degrees, even if the valve timing is varied by variable valve timing mechanism 113, 2 cam angle signals are continuously output.

Contrary to the above, in the case where the reference crank angle position A corresponds to 130 degrees before the compression top dead center of #1 cylinder, even if the valve timing is varied, 1 cam angle signal or no cam angle signal is output in the judgment interval.

Accordingly, in the case where it is determined that the number of cam angle signals output in the determination interval is 2, the current reference crank angle position A corresponds to 10 degree before the compression top dead center of #3 cylinder.

Then, the routine proceeds from step S5 to step S6, to indicate that the cylinder which next reaches the compression top dead center is #1 cylinder, by setting 1 to CYLCS.

Note, the determination interval is set in view of the variation of valve timing and also the dispersion in output position of the cam angle signal.

On the other hand, in the case where the number of cam angle signals outputted in the judgment interval is not 2, the current reference crank angle position A corresponds to 130 degrees before the compression top dead center of #1 cylinder. In this case, the processing in step S6 is bypassed to thereby terminate the present routine, so that the above CYLCS is held at a previous value without updated.

Further, in the case where it is determined in step S2 that POSCNTZ0 is not 9, the routine proceeds to step S7, where it is determined whether or not POSCNTZ0=21.

When POSCNTZ0=21, the determination of POSCNT=4 indicates that the unit crank angle signal POS is the fifth unit crank angle signal POS in the interval in which the unit crank angle signals POS of 10 in number are continuously output.

Here, the angle position of crankshaft, at which POSCNT=4 and also POSCNTZ0=21, is made a reference crank angle position B.

The reference crank angle position B is a position which goes on to the reference crank angle position A by 120 degrees.

The reference crank angle position B is at 10 degrees before the compression top dead center of #1 cylinder and also at 130 degrees before the compression top dead center of #2 cylinder.

When the reference crank angle position B is detected, the routine proceeds to step S8, where provided that a current reference crank angle position B is at 10 degrees before the compression top dead center of #1 cylinder, it is determined to be the timing for determining whether or not the cylinder which next reaches the compression top dead center is #2 cylinder.

In next step S9, an angular range of 120 degrees, in which a crank angle position which goes back from the reference crank angle position B by the unit crank angle signals POS of the counted number of 14 is made the commencement and a crank angle position which goes back from the reference crank angle position B by the unit crank angle signals POS of the counted number of 4 is made the termination, is set as the determination interval of the cam angle signal.

In next step S10, similarly to the processing in step S5, it is determined whether or not the number of the cam angle signals output in the judgment interval set in step S9 is 1.

As shown in FIG. 3, in the case where the reference crank angle position B corresponds to 10 degrees before the compression top dead center of #1 cylinder, in the determination interval, one cam angle signal is output even if the valve timing is varied by variable valve timing mechanism 113.

Contrary to the above, in the case where the reference crank angle position B corresponds to 130.degrees before the compression top dead center of #2 cylinder, no cam angle signal is output in the judgment interval, even if the valve timing is varied.

Accordingly, in the case where it is determined that the number of the cam angle signals output in the determination interval is 1, the current reference crank angle position B corresponds to 10.degrees before the compression top dead center of #1 cylinder, and therefore, the routine proceeds to step S11, where 2 is set to CYLCS so as to indicate that the cylinder which next reaches the compression top dead center is #2 cylinder.

On the other hand, in the case where the number of the cam angle signals output in the determination interval is not 1, the current reference crank angle position B corresponds to 130.degrees before the compression top dead center of #2 cylinder. In this case, the processing in step S11 is bypassed to thereby terminate the present routine, so that CYLCS is held at the previous value without updated.

Further, if it is determined in step S1 that the value of counter POSCNT is not 4, the routine proceeds to step S12.

In step S12, it is determined whether or not the value of counter POSCNT is 16.

The value of counter POSCNT reaches 16 only once during one rotation of the crankshaft, and therefore, a position at which the value of counter POSCNT is 16 is made a reference crank angle position C.

Note, the reference crank angle position C is a position retarded by 120.degrees from the reference crank angle position A.

The reference crank angle position C is at 10.degrees before the compression top dead center of #2 cylinder and also at 130.degrees before the compression top dead center of #3 cylinder.

When it is determined in step S12 that the value of counter POSCNT is 16, the routine proceeds to step S13, where it is determined whether or not CYLCSZ being a previous value of CYLCS is 2.

When the reference crank angle position C is at 130.degrees before the compression top dead center of #3 cylinder, CYLCSZ=1, while when the reference crank angle position C is at 10.degrees before the compression top dead center of #2 cylinder, CYLCSZ=2. Accordingly, in the case where it is determined in step S13 that CYLCSZ=2, a current reference crank angle position C corresponds to 10.degrees before the compression top dead center of #2 cylinder.

When it is determined in step S13 that CYLCSZ=2, the routine proceeds to step S14.

In step S14, it is determined to be the timing for determining whether or not the cylinder which next reaches the compression top dead center is #3 cylinder, with the current crank angle position C as a reference.

In next step S15, an angular range of 120.degrees, in which a crank angle position which goes back from the reference crank angle position C by the unit crank angle signals POS of the counted number of 16 is made the commencement and a crank angle position which goes back from the reference crank angle position C by the unit crank angle signals POS of the counted number of 4 is made the termination, is set as the determination interval of the cam angle signal.

In next step S16, similarly to the processing in step S5, it is determined whether or not the number of the cam angle signals output in the determination interval set in step S15 is 1.

As shown in FIG. 3, in the case where the reference crank angle position C corresponds to 10.degrees before the compression top dead center of #2 cylinder, in the judgment interval, one cam angle signal is output even if the valve timing is varied by variable valve mechanism 113.

Accordingly, in the case where it is determined that the number of the cam angle signal output in the judgment interval is 1, it is affirmed that the current reference crank angle position C corresponds to 10.degrees before the compression top dead center of #2 cylinder. In this case, the routine proceeds from step S16 to step S17, where 3 is set to CYLCS to thereby indicate that the cylinder which next reaches the compression top dead center is #3 cylinder.

On the other hand, in the case where the number of the cam angle signals output in the judgment interval is not 1, although it is determined that the current reference crank angle position C corresponds to 10.degrees before the compression top dead center of #2 cylinder, such judgment cannot be affirmed from the cam angle signal and therefore, the present routine is terminated without proceeding to the subsequent steps, so that CYLCS is held at the previous value without updated.

Further, when it is determined in step S13 that CYLCSZ is not 2, it is determined that the current reference crank angle position C corresponds to 130.degrees before the compression top dead center of #3 cylinder. Therefore, the present routine is terminated without proceeding to the subsequent steps, so that CYLCS is held at the previous value without updated.

Moreover, when it is determined in step S12 that POSCNT is not 16, it is determined that the crank angle position does not corresponds to any one of the reference crank angle positions A to C. Therefore, also in this case, CYLCS is not updated and the present routine is terminated without proceeding to the subsequent steps.

As described in the above, in this embodiment, the portions to be detected of the number of 1, 1, and 2, which are detected by cam sensor 132, are merely disposed on the signal plate at each 120.degrees of cam angle. Thereby, it is possible to determine whether or not the reference crank angle position at each crank angle of 120.degrees is the position at 10.degrees before the compression top dead center, and further, to determine the cylinder which next reaches the compression top dead center.

Consequently, even if cam sensor 132 is a sensor having the low resolution, such as an electromagnetic pickup or the like, it is possible to sufficiently ensure the generation interval of the cam angle signal, to thereby determine the piston position with high precision.

Further, in the case where variable valve timing mechanism 113 is provided as in this embodiment, for example the angle of from the compression top dead center of each cylinder until the next cam angle signal is outputted, can be measured, so that an advance angle amount of the valve timing by variable valve timing mechanism 113 can be detected.

Incidentally, the present invention can be applied to an odd number-cylinder engine of five cylinders or more.

Moreover, in this embodiment, the number of the cam angle signals output in the determination interval is determined. However, it is possible to determine the piston position based on the pulse width of the cam angle signal output in the determination interval.

Furthermore, it is also possible to set variably the determination interval based on an advance angle value by variable valve timing mechanism 113.

The entire contents of Japanese Patent Application No. 2005-183773 on Jun. 23, 2005, a priority of which is claimed, are incorporated herein by reference.

While only a selected embodiment has been chosen to illustrate the present invention, it will be apparent to those skilled in the art from this disclosure that various changes and modifications may be made herein without departing from the scope of the invention as defined in the appended claims.

Furthermore, the foregoing description of the embodiment according to the present invention is provided for illustration only, and not for the purpose of limiting the invention as defined in the appended claims and their equivalents.

We claim:

1. A piston position determining apparatus for determining a piston position in each cylinder of an engine of which the number of cylinders is an odd number, comprising:

a detector that detects which of a plurality of reference angle positions a crankshaft of said engine arrives at;

a signal generator that outputs a cam angle signal at a predetermined angle position of a camshaft of said engine; and a determining section that determines a crank angle region in which an output pattern of said cam angle signal is determined based on which of said plurality of reference angle positions said crankshaft arrives at, and further determines whether or not it is time for determining the piston position based on the output pattern of said cam angle signal in said crank angle region, said determining section determining the cylinder corresponding to a predetermined piston position based on the output pattern of said cam angle signal in said crank angle region when it is time for judging the piston position.

2. The apparatus according to claim 1, wherein said determining section detects the generation frequency of said cam angle signal in said crank angle region, and further determines whether or not it is time for determining a piston position on the basis of the generation frequency of said cam angle signal to thereby determine the piston position of each cylinder based on the generation frequency.

3. The apparatus according to claim 1, wherein said determining section detects the pulse width of said cam angle signal output in said crank angle region, and further determines whether or not it is time for determining a piston position on the basis of the pulse width to thereby determine the piston position in each cylinder based on said pulse width.

4. The apparatus according to claim 1, wherein said determining section sets the angular width of said crank angle region at a different value for each of said plurality of reference angle positions.

5. The apparatus according to claim 1, wherein said determining section determines an angle of from said reference angle position to said crank angle region, based on which of said plurality of reference angle positions said crankshaft arrives at.

6. The apparatus according to claim 1, wherein said engine is a three-cylinder engine.

7. A piston position determining apparatus for determining a piston position in each cylinder of an engine, comprising:

- a unit angle generating device which is a device for generating a unit angular signal at each time when said crankshaft is rotated by a unit angle, and makes said unit angular signal not to be outputted at a plurality of portions of different angular intervals;
- a counter which is counted up in its value at each generation of said angular signal, while being reset at said portions where no angular signal is outputted;
- a reference angle position detecting section that detects which of a plurality of reference angle positions a crankshaft of said engine arrives at on the basis of the value of said counter;
- a signal generator that outputs a cam angle signal at a predetermined angle position of a camshaft of said engine; and
- a determining section that determines a crank angle region in which an output pattern of said cam angle signal is determined based on which of said plurality of reference angle positions said crankshaft arrives at, to determine the piston position in each cylinder.

8. The apparatus according to claim 7, wherein said determining section detects the generation frequency of said cam angle signal in said crank angle region, and determines the piston position of each cylinder based on the generation frequency.

9. The apparatus according to claim 7, wherein said determining section detects the pulse width of said cam angle signal output in said crank angle region, and determines the piston position in each cylinder based on said pulse width.

10. The apparatus according to claim 7, wherein said determining section sets the angular width of said crank angle region at a different value for each of said plurality of reference angle positions.

11. The apparatus according to claim 7, wherein said determining section determines an angle of from said reference angle position to said crank angle region, based on which of said plurality of reference angle positions said crankshaft arrives at.

12. The apparatus according to claim 7, wherein the number of cylinders in said engine is an odd number, and wherein said determining section determines whether or not it is time for determining the piston position based on the output pattern of said cam angle signal in said crank angle region, and further determines the cylinder corresponding to a predetermined piston position based on the output pattern of said cam angle signal in said crank angle region when it is time for judging the piston position.

13. A piston position determining method for determining a piston position in each cylinder of an engine of which the number of cylinders is an odd number, comprising the steps of:

- outputting a cam angle signal at a predetermined angle position of a camshaft of said engine;
- detecting which of a plurality of reference angle positions a crankshaft of said engine arrives at;
- determining a crank angle region in which an output pattern of said cam angle signal is determined, based on which of the plurality of reference angle positions said crankshaft arrives at;
- determining the output pattern of said cam angle signal in the crank angle region;
- determining whether or not it is time for determining the piston position based on the output pattern of said cam angle signal in said crank angle region; and
- determining, when it is time for determining the piston position, the cylinder corresponding to a predetermined piston position based on the output pattern of said cam angle signal in said crank angle region.

14. The method according to claim 13, wherein said determining step of the output pattern comprises the step of detecting number of generation of said cam angle signal in the crank angle region.

15. The method according to claim 13, wherein said determining step of the output pattern comprises the step of detecting the pulse width of said cam angle signal output in the crank angle region.

16. The method according to claim 13, wherein said determining step of the crank angle region comprises the step of setting the angular width of said crank angle region at a different value for each of said plurality of reference angle positions.

17. The method according to claim 13, wherein said determining step of the crank angle region comprises the step of determining an angle of from said reference angle position to said crank angle region, based on which of said plurality of reference angle positions said crankshaft arrives at.

18. The method according to claim 13, wherein said engine is a three-cylinder engine.

19. A piston position determining method for determining a piston position in each cylinder of an engine, comprising the steps of:

- outputting a cam angle signal at a predetermined angle position of a camshaft of said engine;
- generating an angular signal at each time when said crankshaft is rotated by a unit amount of angle;
- compelling said angular signal to cease outputting thereof at a plurality of locations defining different angular intervals thereamong;
- counting up number of generation of said angular signal; resetting said counting result at said locations where no angular signal is outputted;
- detecting which of a plurality of reference angle positions a crankshaft of said engine arrives at, based on the result of the counting up of the number of generation of said angular signal;
- determining a crank angle region in which an output pattern of said cam angle signal is determined, based on which of the plurality of reference angle positions said crankshaft arrives at;

determining the output pattern of said cam angle signal in the crank angle region; and determining the piston position in each cylinder based on the output pattern of said cam angle signal in the crank angle region.

20. The method according to claim 19, wherein said determining step of the output pattern comprises the step of detecting number of generation of said cam angle signal in the crank angle region.

21. The method according to claim 19, wherein said determining step of the output pattern comprises the step of detecting the pulse width of said cam angle signal output in the crank angle region.

22. The method according to claim 19, wherein said determining step of the crank angle region comprises the step of setting the angular width of said crank angle region at a different value for each of said plurality of reference angle positions.

23. The method according to claim 19, wherein said determining step of the crank angle region comprises the step of determining an angle of from said reference angle position to said crank angle region, based on which of said plurality of reference angle positions said crankshaft arrives at.

24. The method according to claim 19, wherein the number of cylinders in said engine is an odd number, and wherein the step of determining the piston position in each cylinder comprises the step of determining whether or not it is time for determining the piston position based on the output pattern of said cam angle signal in said crank angle region.

25. A piston position determining apparatus for determining a piston position in each cylinder of an engine, comprising:

a unit angle generating device which is a device for generating a unit angular signal at each time when said crankshaft is rotated by a unit angle, and makes said unit angular signal not to be outputted at a plurality of portions of different angular intervals;

a signal generator that outputs a cam angle signal at a predetermined angle position of a camshaft of said engine; and a determining section that permits said unit angular signal and said cam angle signal to be inputted therein to thereby determine a piston position in each cylinder.

26. The apparatus according to claim 25, wherein said determination section:

determines which of a plurality of reference angle positions the crankshaft of said engine arrives at, based on the portions at which said unit angular signal is made not to be outputted by said unit angle generating device, determines a crank angle region in which an output pattern of said cam angle signal is determined at each of said plurality of reference angle positions, and determines the piston position in said each cylinder based on the output pattern of said cam angle signal in said crank angle region.

27. The apparatus according to claim 26, wherein said determination section determines an angular width of said crank angle region at a different value for each of said plurality of reference angle positions.

28. The apparatus according to claim 26, wherein said determination section makes respective angles from said plurality of reference angle positions to said crank angle region be different from one another for every said plurality of reference angle positions.

29. The apparatus according to claim 26, wherein the number of cylinders of said engine is an odd number, and wherein said determination section determines whether or not it is time for determining the piston position based on the output pattern of said cam angle signal in said crank angle region, and determines the cylinder corresponding to a predetermined piston position based on the output pattern of said cam angle signal in said crank angle region when it is time for judging the piston position.

* * * * *